(12) United States Patent
Ueno et al.

(10) Patent No.: US 6,364,085 B1
(45) Date of Patent: Apr. 2, 2002

(54) ACTUATOR WITH SLIPPING PREVENTION STRUCTURE

(75) Inventors: Naoki Ueno, Hamamatsu; Takayuki Yamamoto, Aichi-gun, both of (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/592,415

(22) Filed: Jun. 13, 2000

(30) Foreign Application Priority Data

Jun. 14, 1999 (JP) ............................................. 11-166962
Nov. 11, 1999 (JP) ............................................. 11-321479

(51) Int. Cl.[7] ............................................... F16D 65/34
(52) U.S. Cl. ..................... 192/219.4; 192/222; 188/156
(58) Field of Search .............................. 192/219.4, 222, 192/226; 188/156

(56) References Cited

U.S. PATENT DOCUMENTS

| | | | |
|---|---|---|---|
| 5,024,299 A | * 6/1991 | Shaw et al. | ................. 188/156 |
| 5,074,388 A | * 12/1991 | Dodd et al. | ................. 188/156 |
| 5,219,049 A | 6/1993 | Unterborn | |
| 5,310,026 A | 5/1994 | Shaw et al. | |
| 5,785,157 A | * 7/1998 | Scott et al. | ................. 188/156 |
| 5,855,255 A | 1/1999 | Bock et al. | |

* cited by examiner

*Primary Examiner*—Richard M. Lorence
(74) *Attorney, Agent, or Firm*—Law Office of David G. Posz

(57) ABSTRACT

An actuator for driving a load includes a driving motor for driving and operating an output shaft, and a slipping prevention unit for preventing a slipping of the output shaft due to an external force from a load side. The slipping prevention unit includes a regulation gear which is disposed to engage or disengage with a pinion rotating with a rotation of the driving motor, and a switching motor which electrically switches operation of the regulation gear between an engagement state and a non-engagement state. In the engagement state, the regulation gear engages with the pinion so that at least one side rotation of the pinion is prevented. Thus, the actuator having the slipping prevention unit has a simple structure.

13 Claims, 13 Drawing Sheets

FIG. 8
FIG. 9
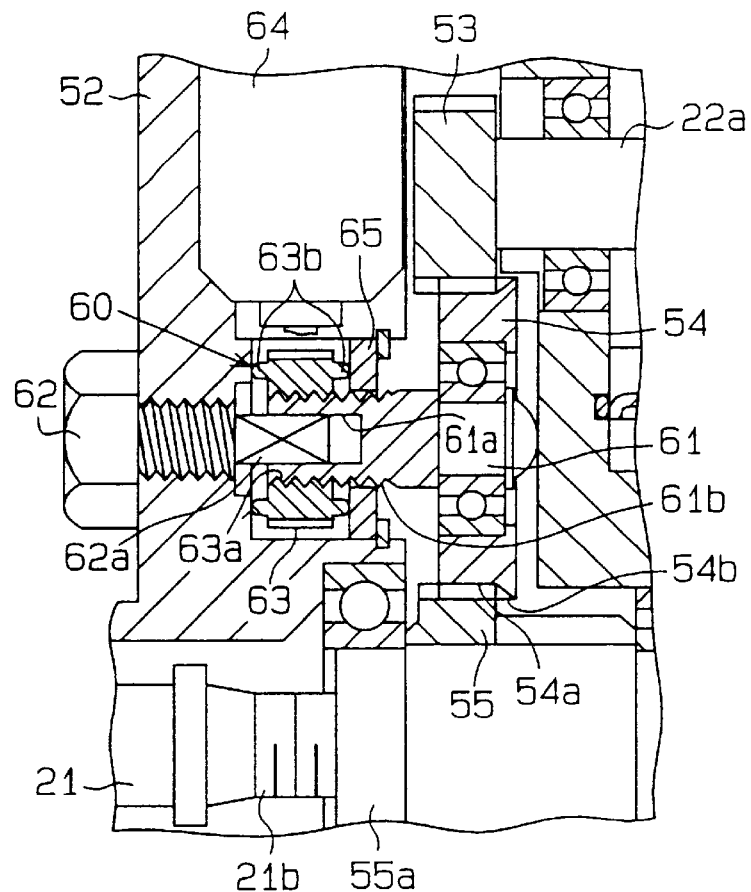
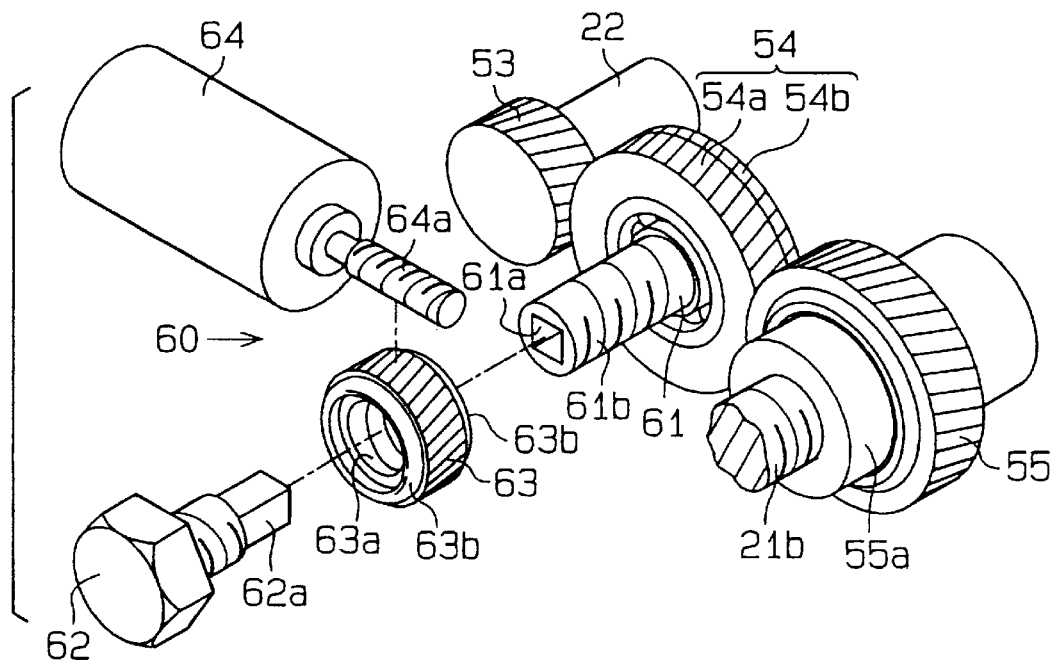

ACTUATOR WITH SLIPPING PREVENTION STRUCTURE

CROSS-REFERENCE TO RELATED APPLICATION

This application is related to and claims priority from Japanese Patent Applications No. Hei. 11-166962 filed on Jun. 14 1999, and No. Hei. 11-321479 filed on Nov. 11, 1999, the contents of which are hereby incorporated by reference.

BACKGROUND OF THE INVENTION

1. Field of the Invention

The present invention relates to an actuator having a slipping prevention unit which prevents a slipping of an output shaft due to an external force from a load side. The actuator is suitably used for a vehicle brake device, for example.

2. Description of Related Art

In a conventional brake device operated by an actuator using an electrical motor, an electrically driven parking brake mechanism is provided. For example, in a brake device described in U.S. Pat. No. 5,219,049, when a parking brake is braked, a slipping of an output shaft of an actuator is prevented while a brake is operated by the actuator. However, the structure of a parking brake mechanism is complicated, and many components including both friction plates are necessary for the parking brake mechanism.

SUMMARY OF THE INVENTION

In view of the foregoing problems, it is an object of the present invention to provide an actuator having a slipping prevention unit which is constructed with a simple structure and prevents a slipping of an output shaft due to an external force from a load side.

According to the present invention, actuator having an output shaft for driving a load includes a driving motor for driving and operating the output shaft, and a slipping prevention unit which prevents a slipping of the output shaft due to an external force from a load side. The slipping prevention unit includes a rotation regulation unit having an engagement portion engaging with a rotation member, and a switching unit which electrically switches operation of the rotation regulation unit between an engagement state where the engagement portion of the rotation regulation unit engages with the rotation member, and a non-engagement state where the engagement portion is disengaged with the rotation member. The engagement portion has a contact surface in a rotation direction for contacting the rotation member, and the rotation regulation unit is disposed so that at least one side rotation of the rotation member is prevented in the engagement state. Thus, when the engagement portion engages with the rotation member by the switching unit, at least the one side rotation of the rotation member becomes impossible. As a result, the actuator prevents a slipping of the output shaft due to the load side, with a simple structure of the slipping prevention unit.

Preferably, in the engagement state, an end surface of the engagement portion in the rotation direction contacts a regulation wall of a housing for accommodating the slipping prevention unit. Therefore, in the engagement state, a rotation of the rotation regulation unit is accurately prevented, and the rotation of the rotation member is accurately prevented.

BRIEF DESCRIPTION OF THE DRAWINGS

Additional objects and advantages of the present invention will be more readily apparent from the following detailed description of preferred embodiments when taken together with the accompanying drawings, in which:

FIG. 8 is an enlarged view showing a main part of the actuator according to the second embodiment;

FIG. 9 is a perspective view showing a slipping prevention unit according to the second embodiment;

DETAILED DESCRIPTION OF THE PRESENTLY PREFERRED EMBODIMENTS

Preferred embodiments of the present invention will be described hereinafter with reference to the accompanying drawings.

Figure 1:
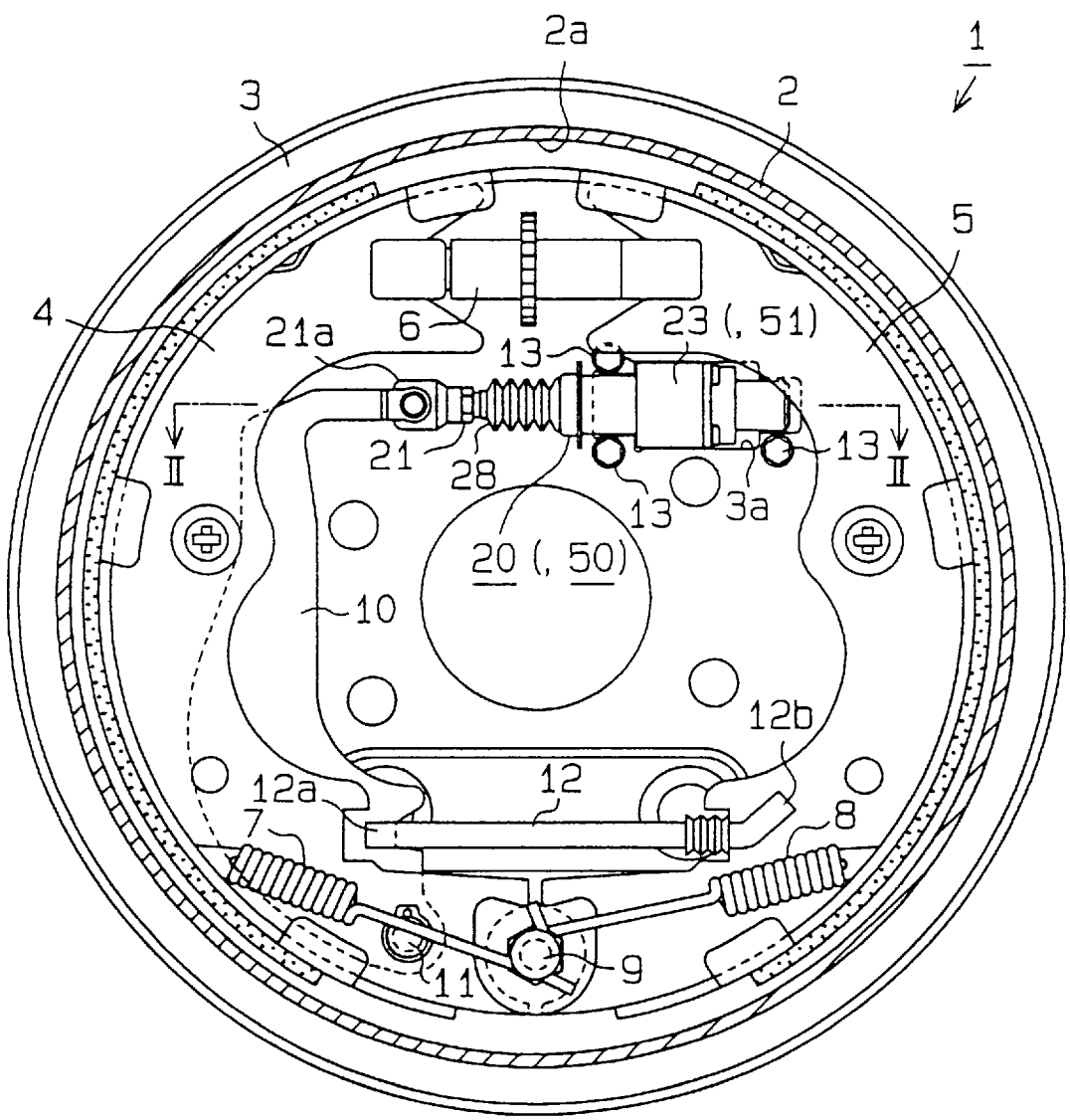
FIG. 1 is a schematic view of a drum brake device according to a first preferred embodiment of the present invention.

A first preferred embodiment of the present invention will be now described with reference to FIGS. 1–6. As shown in FIG. 1, a drum brake device 1 is operated by an actuator using an electrical motor as a driving source. The drum brake device 1 is a duo-servo brake. In the first embodiment, an actuator 20 is typically applied to the drum brake device 1 for a vehicle.

A drum 2 formed into a cylindrical shape having a bottom surface is fixed to a vehicle shaft (not shown), and a circular back plate 3 disposed at an opening side of the drum 2 is fixed to a bracket (not shown) for rotatably supporting the vehicle shaft. Brake shoes 4, 5 are disposed within the drum 2. Each of the brake shoes 4, 5 is formed into a circular arc shape, and is held in the back plate 3 to be contact with and to be separated from an inner peripheral surface 2a of the drum 2.

One side ends of both the brake shoes 4, 5 are coupled to each other through a adjuster 6, and the other side ends of both the brake shoes 4, 5 are connected to a stable pin 9 through return springs 7, 8, respectively. The stable pin 9 is fixed to an outer peripheral portion of the back plate 3. By the spring forces of the return springs 7, 8, the other side ends of the brake shoes 4, 5 contact the stable pin 9 so that the brake shoes 4, 5 are stopped at the positions. At this time, the brake shoes 4, 5 are positioned to be slightly away from the inner peripheral surface 2a of the drum 2.

One end of an operation lever 10 is coupled to the brake shoe 4 at a side of the stable pin 9 through a connection pin 11. An end portion 12a of a connection bar 12 is connected to a portion of the operation lever 10, near the stable pin 9. An another end portion 12b of the connection bar 12 is connected to a portion of the brake shoe 5, near the stable pin 9.

The other end of the operation lever 10 is connected to an operation shaft 21 operated by the actuator 20. The actuator 20 is attached to the back plate 3 using plural bolts 13 (e.g., three bolts in FIG. 1). The position of the operation shaft 21 shown in FIG. 1 is a most protrusion position (i.e., home position) when a brake operation is not performed.

When a brake operation is performed, the actuator 20 operates, the operation shaft 21 moves from the home position to the right side in FIG. 1 to be hidden. In this case, the operation lever 10 is rotated around the connection pin 11 in a clockwise direction in FIG. 1, and is rotated around the end portion 12a of the connection bar 12 in the same rotation direction. Therefore, the brake shoes 4, 5 are expanded while opposing the spring forces of the return springs 7, 8, at the side of the stable pin 9. Thus, the brake shoes 4, 5 contact the inner peripheral surface 2a of the drum 2, so that a friction force is generated between the brake shoes 4, 5 and the drum 2. Due to the friction force, the brake shoes 4, 5 are rotated in the same rotation direction as the drum 2. For example, when the drum 2 rotates in the counterclockwise direction, the end portion of the brake shoe 4 contacts the stable pin 9. That is, the end portion of the brake shoe 4 becomes a fixed end, and both the brake shoes 4, 5 are used as a leading shoe. As a result, a large brake force is obtained in the brake device 1.

Figure 2:
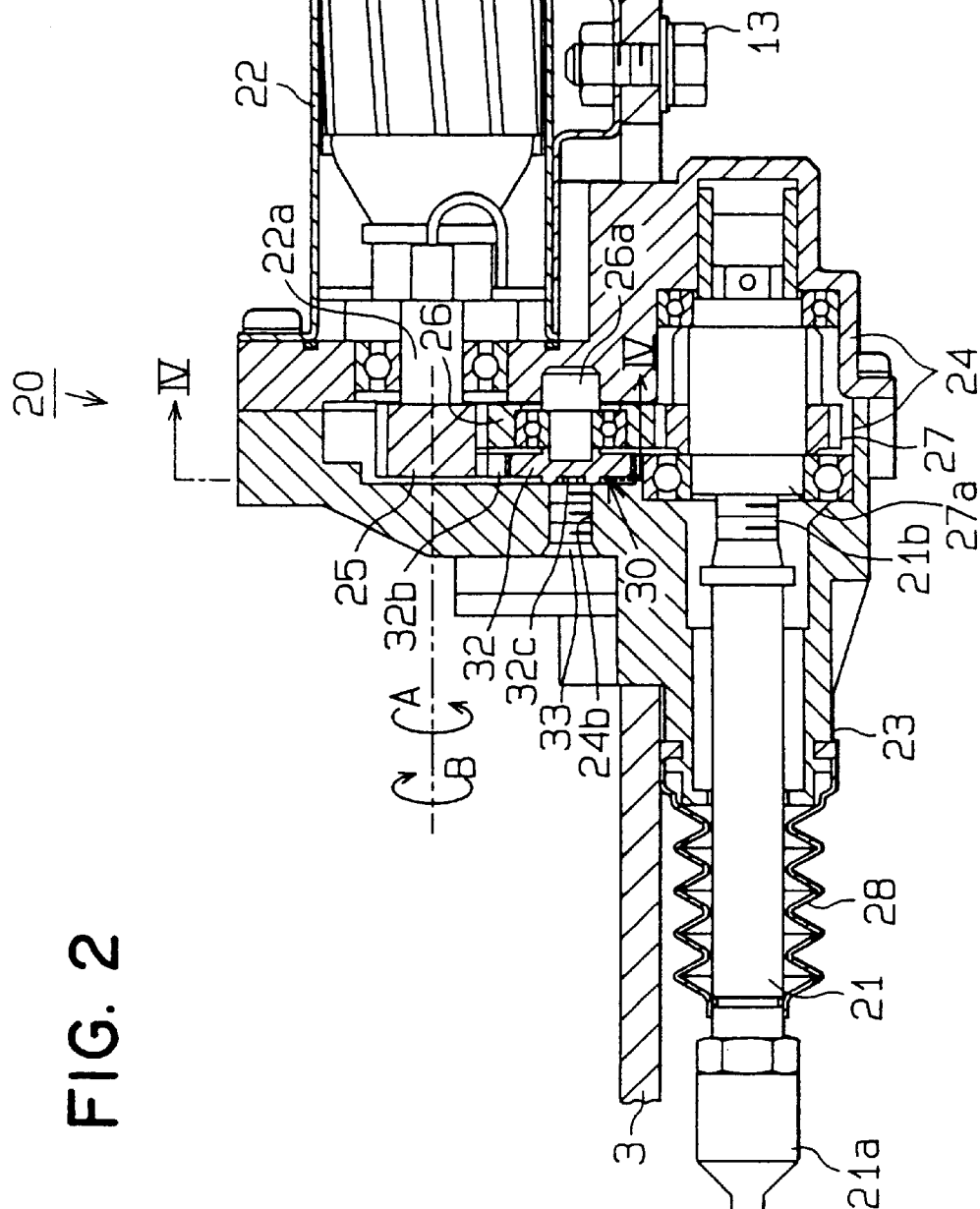
FIG. 2 is a cross-sectional view taken along line II—II in FIG. 1, showing an actuator of the brake device.

As shown in FIG. 2, the actuator 20 includes a driving motor 22, and a brake driving portion 23 which converts the rotation operation of the driving motor 22 to a reciprocating line operation of the operation shaft 21. The driving motor 22 is integrally assembled to a housing 24 of the brake driving portion 23, and the housing 24 and the driving motor 22 are fixed to the back plate 3. A pinion 25 is attached to a rotation shaft 22a of the driving motor 22, and is engaged with a first reduction gear 26. The first reduction gear 26 is engaged with a second reduction gear 27 having an output shaft portion 27a in which a screw hole (not shown) is provided in an axial direction.

On the other hand, the operation shaft 21 is held to be movable in the axial direction while being not rotatable. The operation shaft 21 includes a connection portion 21a connected to the operation lever 10 at one end side, and a worm portion 21b at the other end side. The worm portion 21b is screwed into the screw hole of the output shaft portion 27a. A boot 28 for preventing a foreign substance from being introduced is attached between the operation shaft 21 and an opening portion of the housing 24.

Figure 3:
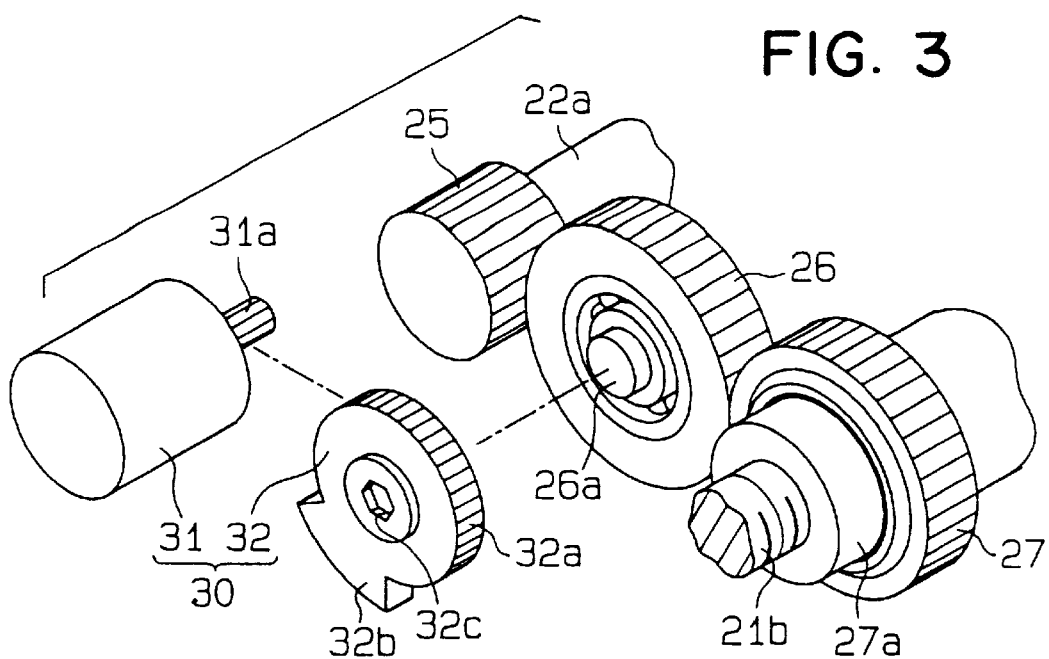
FIG. 3 is a perspective view showing a slipping prevention unit according to the first embodiment.

As shown in FIGS. 2, 3, a slipping prevention unit 30 is disposed within the housing 24. The slipping prevention unit 30 switches operation of the pinion 25 from a rotatable state to a non-rotatable state so that a slipping of the output shaft portion 27a due to an external force input from a side (load side) of the output shaft portion 27a is prevented.

The slipping prevention unit 30 includes a switching motor 31 and a regulation gear 32. The switching motor 31 is attached to the housing 24, and a pinion 31a is provided in a rotation shaft of the switching motor 31. The regulation gear 32 is held in a shaft 26a supporting the first reduction gear 26. However, the regulation gear 32 is not rotated integrally with the first reduction gear 26.

The regulation gear 32 includes a first engagement portion 32a engaged with the pinion 31a of the switching motor 31, and a second engagement portion 32b engaged with the pinion 25 of the driving motor 22. The second engagement portion 32b protrudes from the first engagement portion 32a to an outside to have a circular arc shape. The regulation gear 32 is rotated by the operation of the switching motor 31, and the rotation of the regulation gear 32 is regulated in a predetermined angle by a regulation wall 24a formed in the housing 24. Further, the regulation gear 32 is operated by the switching motor 31 to be switched between an engagement position, shown in FIG. 5 where the second engagement portion 32b engages with the pinion 25 of the driving motor 22, and a non-engagement position shown in FIG. 4 where the second engagement portion 32b does not engage with the pinion 25 of the driving motor 22.

Figure 5:
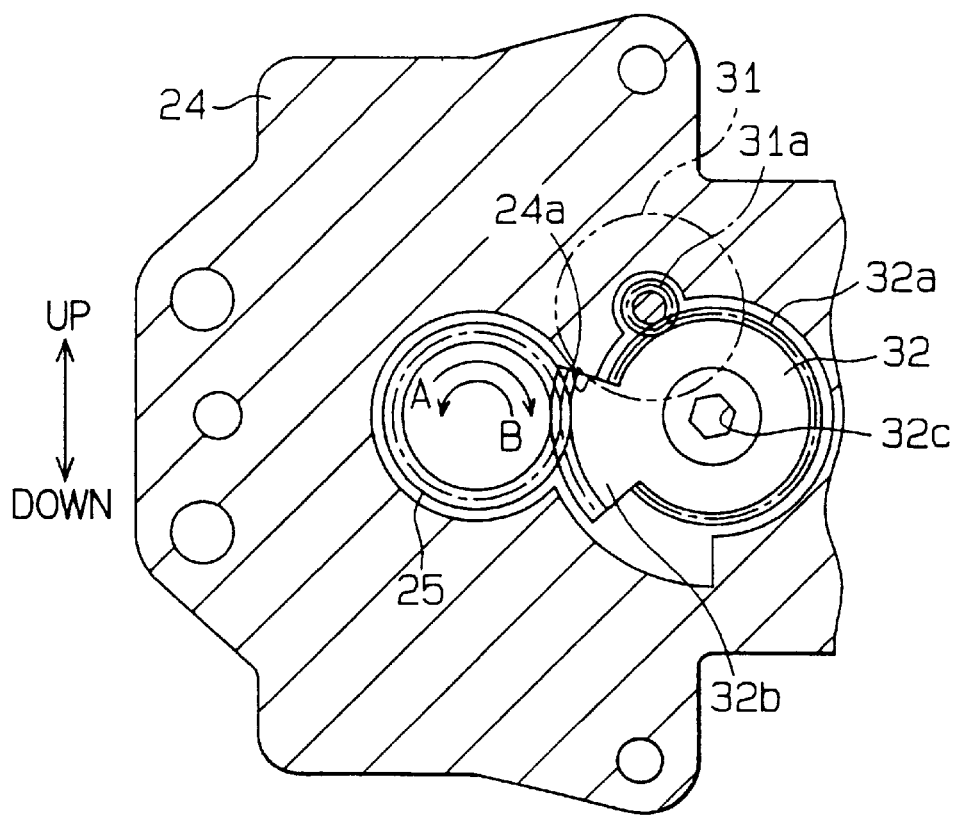
FIG. 5 is a cross-sectional view showing the slipping prevention unit at an engagement position according to the first embodiment.
Figure 6:
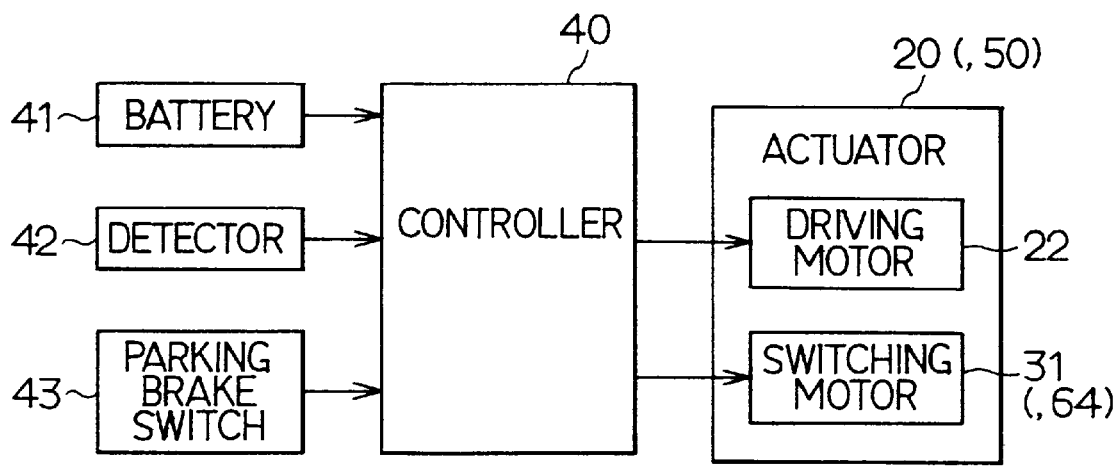
FIG. 6 is block diagram showing a brake controller for electrically controlling the brake device according to the first embodiment.

In a case where the regulation gear 32 is operated to the engagement position shown in FIG. 5, even when a rotation force is applied to the pinion 25 in the counterclockwise direction (i.e., the direction shown by B in FIG. 5), an end surface of the second engagement portion 32b in a peripheral direction contacts the regulation wall 24a so that the regulation gear 32 is prevented from being further rotated in the clockwise direction. Therefore, the rotation of the pinion 25 in the counterclockwise direction (B direction) is prohibited.

In the first embodiment, the regulation gear 32 is disposed so that the non-engagement position of the regulation gear 32 is maintained by the self-weight. A hexagonal tool connection hole 32c into which a tool such as a hexagonal spanner is inserted is formed in the regulation gear 32 at a side opposite to the first reduction gear 26. As shown in FIG. 2, an insertion hole 24b is formed in the housing 24 at a position corresponding to the tool connection hole 32c to penetrate through from an outside of the housing 24 until the regulation gear 32. The insertion hole 24b is a screw hole into which a bolt 33 is screwed. A top end of the bolt 33 approximately contacts the regulation gear 32, so that thrusting load of the regulation gear 32 is received. In FIG. 2, the arrow "X" indicates a side of the drum 2, and the arrow "Y" indicates a side opposite the drum 2.

Next, an electrical control structure for driving the brake device 1 will be now described. The brake device 1 is controlled by a brake controller 40 mounted on a vehicle, and electrical power from a vehicle battery 41 is supplied to the brake controller 40. A stepping amount detector 42 for detecting a stepping amount of a brake pedal due to a driver is connected to the controller 40 so that a stepping signal corresponding to the stepping amount of the brake pedal is input from the stepping amount detector 42 to the controller 40. A parking brake operation switch 43 mounted on the vehicle is also connected to the controller 40 so that a parking brake operation signal is input from the parking brake operation switch 43 to the controller 40. When the parking brake operation signal is input from the parking brake operation switch 43 into the controller 40, a parking brake mode is selected from a normal brake mode, and the driving motor 22 and the switching motor 31 are controlled in accordance with the selected mode.

First, the normal brake mode will be now described. During the normal brake mode, the controller 40 controls the switching motor 31 so that the regulation gear 32 is disposed to the non-engagement position shown in FIG. 4 and the driving motor 22 is freely operated. In this case, because the regulation gear 32 is maintained at the non-engagement position by the self-weight, the controller 40 stops an electrical supply to the switching motor 31.

Figure 4:
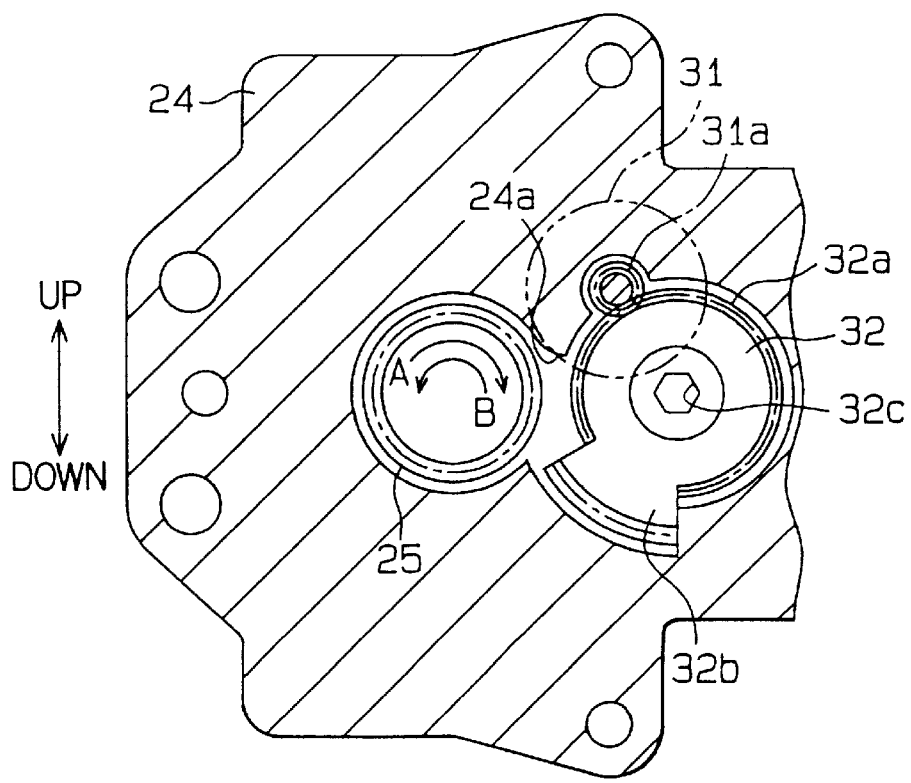
FIG. 4 is a cross-sectional view taken along line IV—IV in FIG. 2, showing the slipping prevention unit at a non-engagement position.

As the stepping amount increases, the driving motor 22 is rotated in the rotation direction A in FIG. 4 by the controller 40. Therefore, the output shaft portion 27a is rotated by the driving motor 22 through the pinion 25, the first reduction gear 26 and the second reduction gear 27, and the operation shaft 21 is hidden. As a result, the brake shoes 4, 5 are expanded by the operation lever 10 while opposing the spring forces of the springs 7, 8, and both the brakes 4, 5 press-contact the inner peripheral surface 2a of the drum 2. That is, in this case, the braking force of the brake device 1 is increased.

On the other hand, when the stepping amount of the brake pedal is reduced during the normal brake mode, the driving motor 22 is controlled by the controller 40 to be rotated in the direction shown by B in FIG. 4. Therefore, the output shaft portion 27a is also rotated by the driving motor 22 so that the operation shaft 21 protrudes. In this case, the operation lever 10 is rotated so that the brake shoes 4, 5 are returned by the spring forces of the springs 7, 8, and the brake shoes 4, 5 move in a direction to be away from the inner peripheral surface 2a of the drum 2. Thus, the braking force of the brake device 1 is reduced.

During the normal brake mode, the controller 40 controls the driving motor 22 based on the stepping amount signal corresponding to the stepping amount of the brake pedal, and a contact state of the brake shoes 4, 5 relative to the brake drum 2 is changed. Therefore, press force of the brake shoes 4, 5 relative to the brake drum 2 is changed, and the brake force of the brake device 1 is controlled.

Next, the parking brake mode will be now described. During the parking brake mode, firstly, the driving motor 22 is controlled by the controller 40 to be rotated in the rotation direction A so that braking force (contact pressure) of the brake shoes 4, 5 relative to the brake drum 2 becomes larger than a predetermined value. That is, the driving motor 22 is rotated in the rotation direction A until a brake force necessary for a vehicle parking is obtained. Next, the controller 40 controls the switching motor 31 so that the regulation gear 32 is rotated in the clockwise direction from the non-engagement position shown in FIG. 4 to the engagement position where the regulation gear 32 engages with the pinion 25 as shown in FIG. 5. At this time, the end surface of the second engagement portion 32b in the rotation direction contacts the regulation wall 24a of the housing 24. Therefore, the rotation of the pinion 25 of the driving motor 22 in the rotation direction B is prohibited. In this case, an electrical power supply to the switching motor 31 is stopped by the controller 40.

During the parking brake mode, an opposite force for separating the brake shoes 4, 5 from the brake drum 2 is always applied to the protrusion direction of the operation shaft 21 (i.e., left direction in FIG. 1) through the operation lever 10. The opposite force is a force for rotating the pinion 25 of the driving motor 22 in the rotation direction B through the output shaft portion 27a, and the gears 27 and 26. However, in the first embodiment of the present invention, because the rotation of the pinion 25 of the driving motor 22 in the rotation direction B is prohibited by the slipping prevention unit 30, a slipping of the output shaft portion 27a is prevented. As a result, during the parking brake mode, the operation shaft 21 is not moved in the protrusion direction (i.e., left direction in FIG. 1), and the brake force of the brake device 1, necessary for a vehicle parking, is maintained. Further, during the parking brake mode, because the rotation force in the rotation direction B is always applied to the driving motor 22, the end surface of the second engagement portion 32b of the regulation gear 32 always press-contacts the regulation wall 24a. Thus, even when electrical power supply to the switching motor 31 is stopped, the engagement position between the regulation gear 32 and the pinion 25 is maintained.

On the other hand, when a parking brake releasing signal is output from the parking brake operation switch 43, the controller 40 controls the driving motor 22 so that the driving motor 22 is rotated in the rotation direction A and the press force of the brake shoes 4, 5 is increased. Thereafter, the controller 40 controls the switching motor 31 so that the regulation gear 32 is moved to the non-engagement position shown in FIG. 4 where the regulation gear 32 does not engage with the pinion 25. Then, an electrical power supplying to the switching motor 31 is stopped. At this time, when the brake pedal is not stepped, the driving motor 22 is rotated in the rotation direction B by the controller 40, and the brake shoes 4, 5 are moved to be away from the brake drum 2. Thus, the brake device 1 is possible to perform the normal brake operation.

In a state where the parking brake is braked, when the driving motor 22 and the switching motor 31 have a trouble or when the driving motor 22 and the switching motor 31 are not operated due to a battery trouble, the parking brake can be manually released in the first embodiment of the present invention. That is, the bolt 33 shown in FIG. 2 is detached, and a tool such as the hexagonal adjustable spanner is inserted into the insertion hole 24b and further inserted into the connection hole 32c of the regulation gear 32. Thereafter, the regulation gear 32 is rotated by the tool from the engagement position to the non-engagement position. Therefore, the pinion 25 of the driving motor 22 becomes free, and is rotated due to an opposing force for separating the brake shoes 4, 5 from the brake drum 2. As a result, the parking brake is released.

According to the first embodiment of the present invention, the slipping prevention unit 30 includes the regulation gear 32 having the second engagement portion 32b engaging with the pinion 25, and the switching motor 31. The regulation gear 32 is rotated by the switching motor 31 so that the engagement position and the non-engagement position is switched. At the engagement position, the second engagement portion 32b and the pinion 25 engage with each other and one side rotation of the regulation gear 32 is regulated. At the non-engagement position, the second engagement portion 32b and the pinion 25 are disengaged. Thus, the slipping prevention unit 30 has a simple structure, and number of components of the actuator 20 is reduced.

Because the rotation of the pinion 25 is regulated by the slipping prevention unit 30 in order to prevent the slipping of the output shaft portion 27a, a special component for preventing the slipping of the output shaft portion 27a is not necessary. Therefore, the number of components of the actuator 20 is further reduced. Because the pinion 25 is an input step of a deceleration unit, the slipping of the output shaft portion 27a is prevented with a small torque. Therefore, the size of the slipping prevention unit 30 is reduced. Further, because the slipping prevention unit 30 is disposed adjacent to the pinion 25, the structure of the actuator 20 in the axial direction becomes simple.

According to the first embodiment, the regulation gear 32 is disposed so that the regulation gear 32 positioned at the non-engagement position is maintained by the self-weight even when electrical power is not supplied to the switching motor 31. Therefore, a specific mechanism for maintaining the regulation gear 32 at the non-engagement position is not necessary, and the structure of the actuator 20 becomes simple.

During the parking brake mode, the rotation force is always applied to the direction in which the end surface of the second engagement portion 32b contacts the regulation wall 24a of the housing 24. Therefore, even when the electrical power supplying to the switching motor 31 is shut off, the engagement between the regulation gear 32 and the pinion 25 are not released during the parking brake mode. Thus, during the parking mode, electrical power is not consumed for the switching motor 31 (actuator 20), and the battery 41 can be used for a long time.

Further, according to the first embodiment of the present invention, the tool connection hole 32c is provided in the regulation gear 32, and it is possible to manually rotate the regulation gear 32 from the engagement position to the non-engagement position. Thus, when the driving motor 22 and the switching motor 31 have a trouble or when the driving motor 22 and the switching motor 31 are not operated due to a battery trouble, the parking brake can be manually released.

Figure 7:
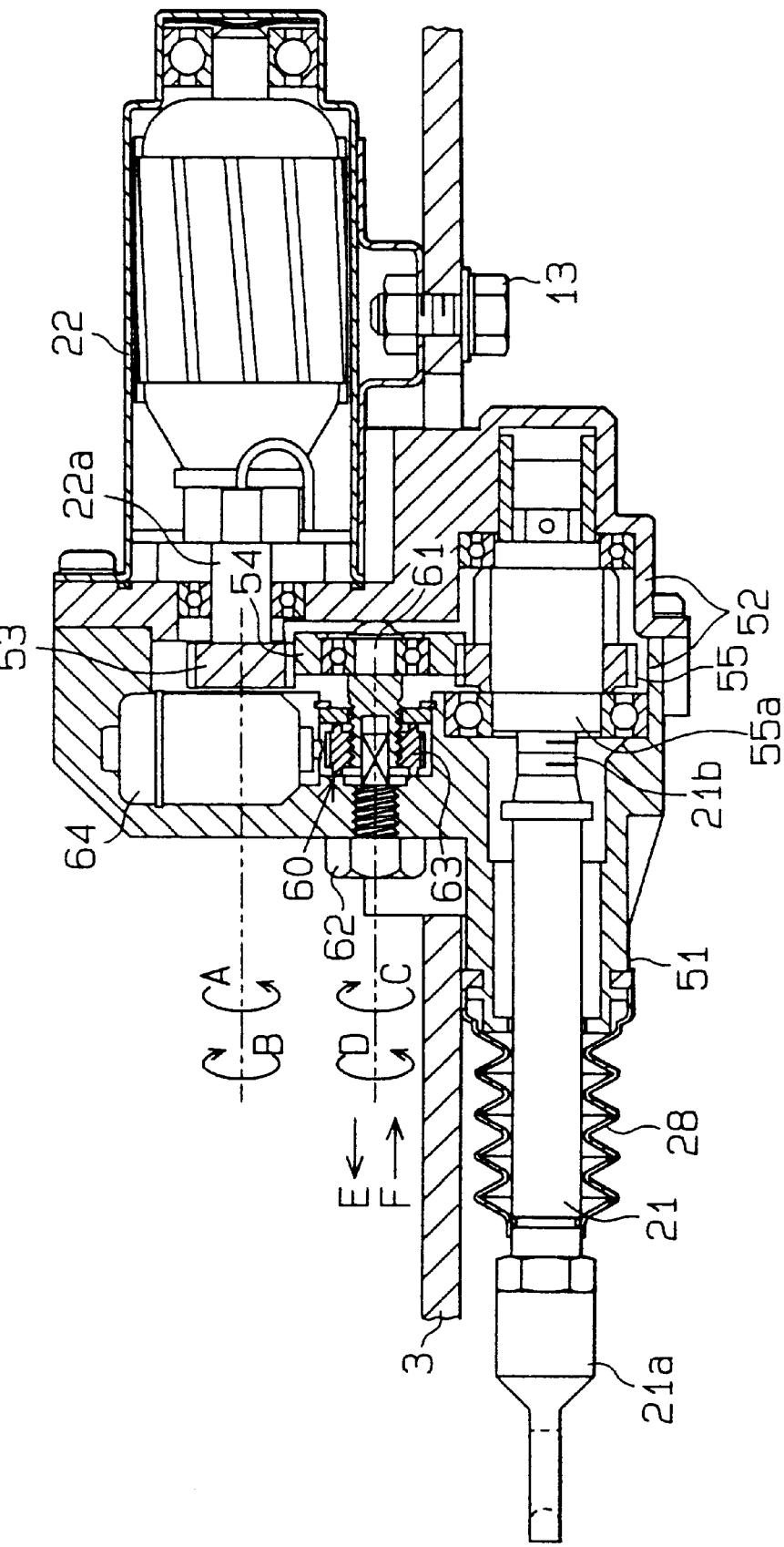
FIG. 7 is a cross-sectional view showing an actuator according to a second preferred embodiment of the present invention.
Figure 10:
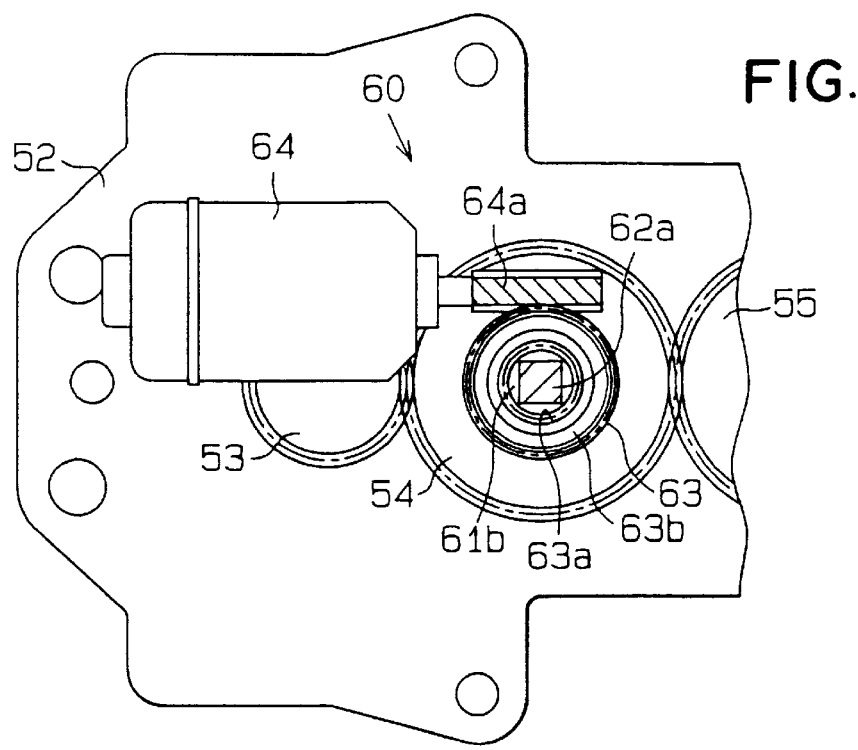
FIG. 10 is a schematic view showing the slipping prevention unit according to the second embodiment.

A second preferred embodiment of the present invention will be now described with reference to FIGS. 7–12. In the second embodiment, a part structure of the actuator is different as compared with the first embodiment. Therefore, in the second embodiment, an actuator 50 shown in FIG. 7 is mainly described. Further, components similar to those in the first embodiment are indicated with the same reference number, and the explanation thereof is omitted.

FIG. 7 shows the actuator 50 of the second embodiment. The actuator 50 includes a driving motor 22, and a brake driving portion 51 which converts the rotation operation of the driving motor 22 to a reciprocating line operation of the driving shaft 21. The driving motor 22 is integrally assembled to a housing 52 of the brake driving portion 51, and the housing 52 and the driving motor 22 are fixed to the back plate 3. A pinion 53 is attached to the rotation shaft 22a of the driving motor 22, and is engaged with a first reduction gear 54. The first reduction gear 54 is engaged with a second reduction gear 55 having an output shaft portion 55a in which a screw hole (not shown) in an axial direction is provided. The worm portion 21b is screwed into the screw hole of the output shaft portion 55a.

Figure 11:
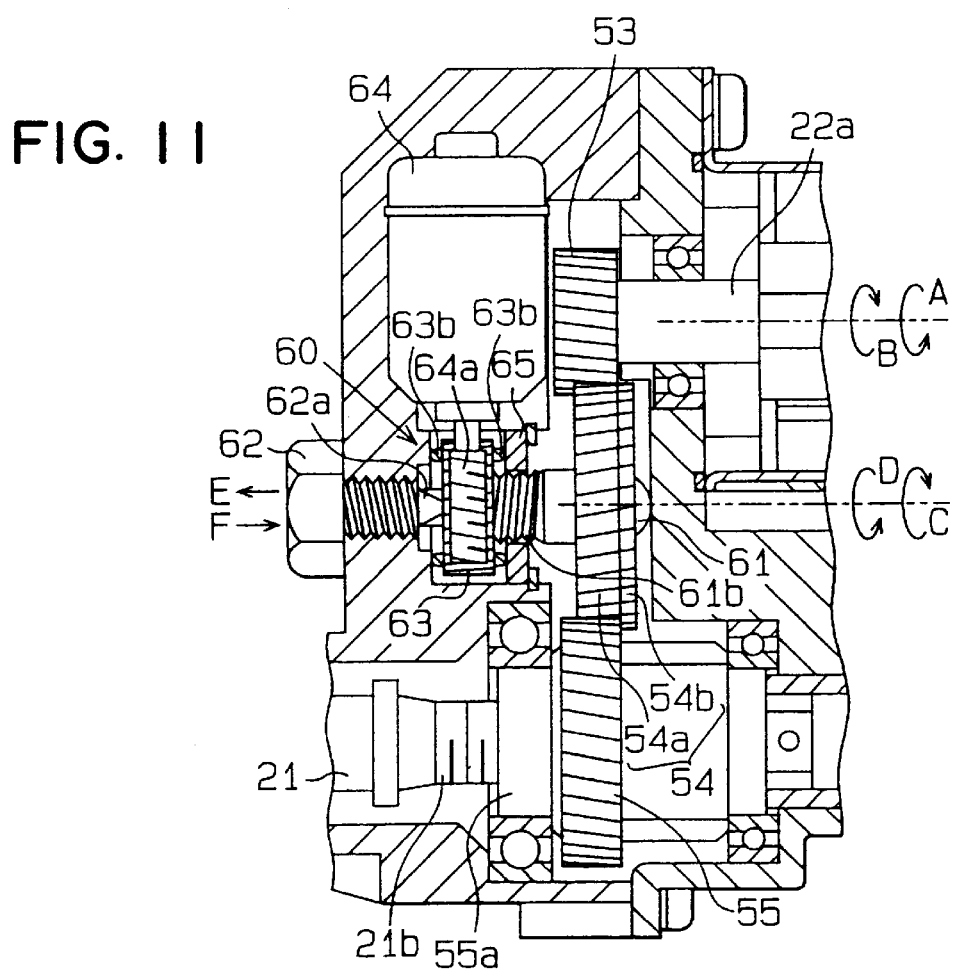
FIG. 11 is a cross-sectional view showing a main part of the actuator at a first connection position of a first reduction gear according to the second embodiment.
Figure 12:
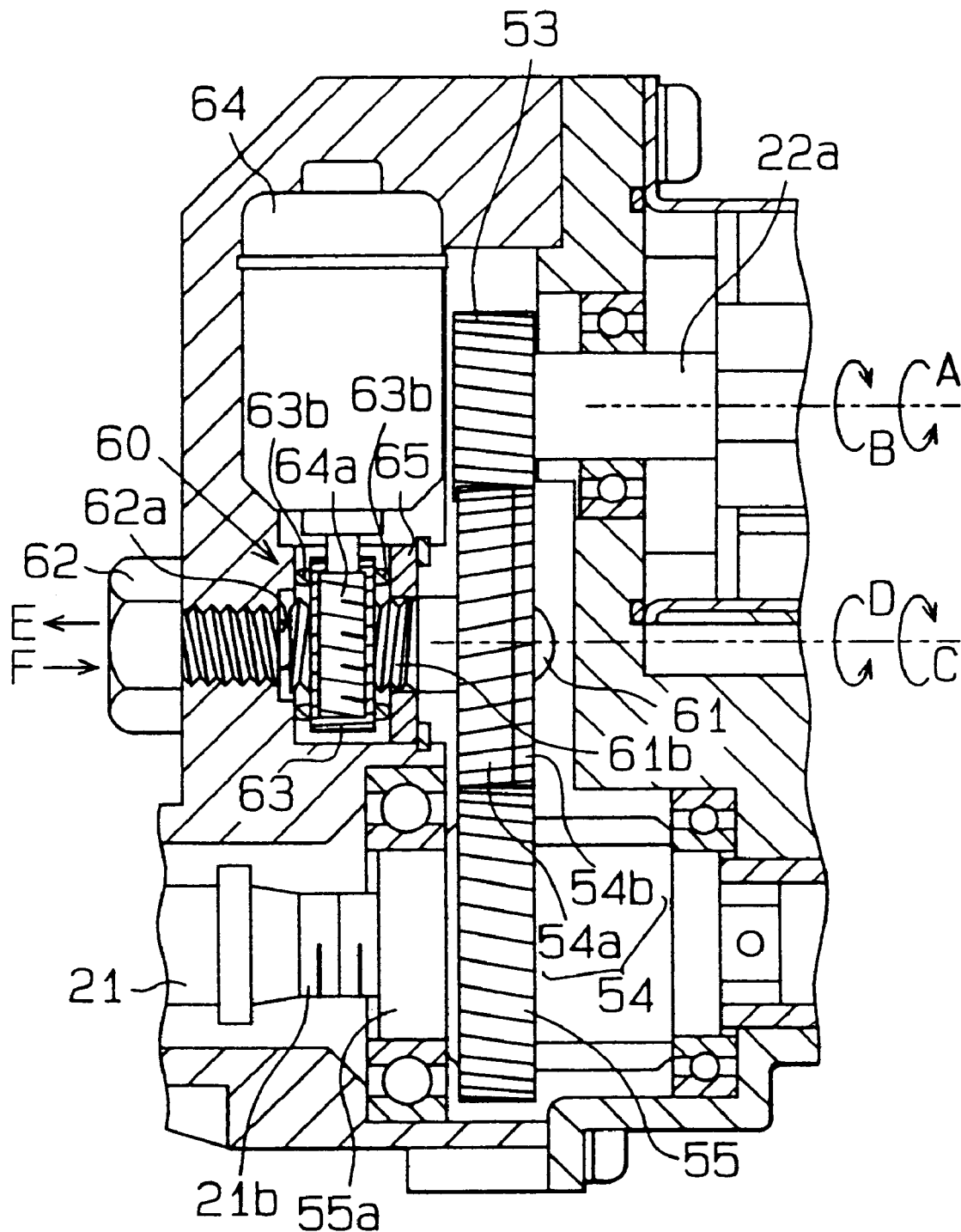
FIG. 12 is a cross-sectional view showing the main part of the actuator at a second connection position of the first reduction gear according to the second embodiment.
Figure 13A:
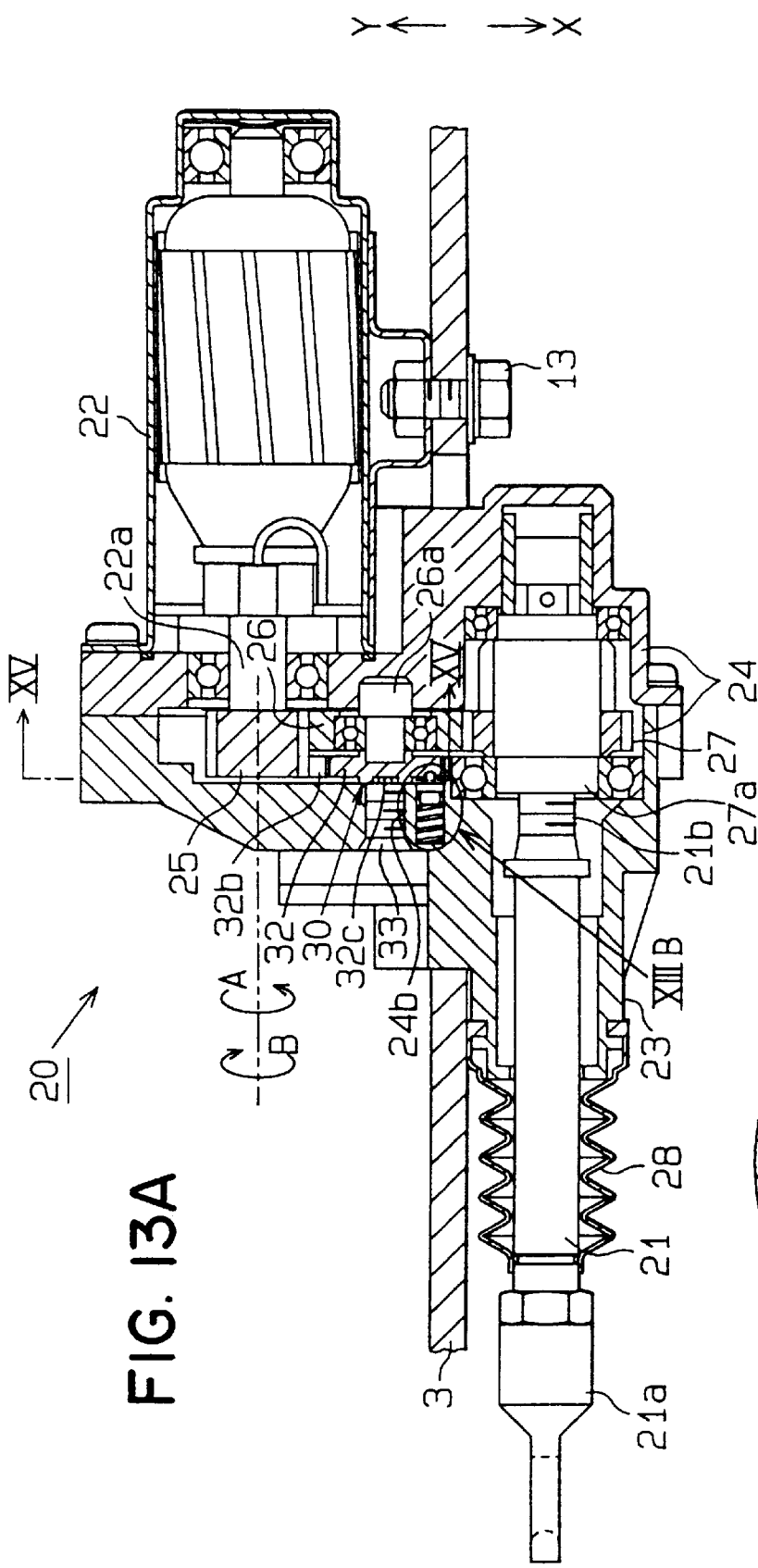
FIG. 13A is a cross-sectional view showing an actuator according to a modification of the present invention.
Figure 13B:
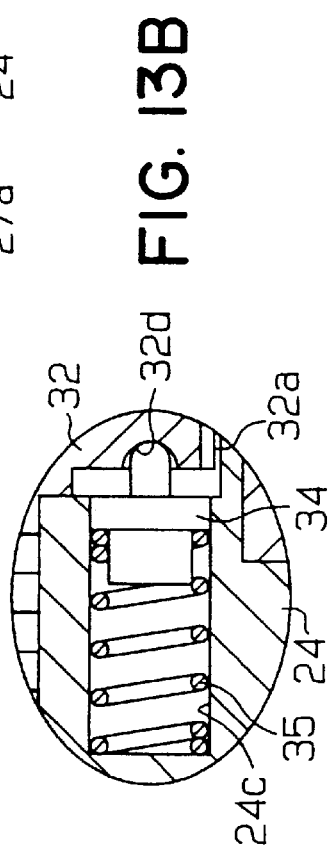
FIG. 13B is an enlarged view of a main part indicated by XIIIB in FIG. 13A according to the modification.
Figure 14:
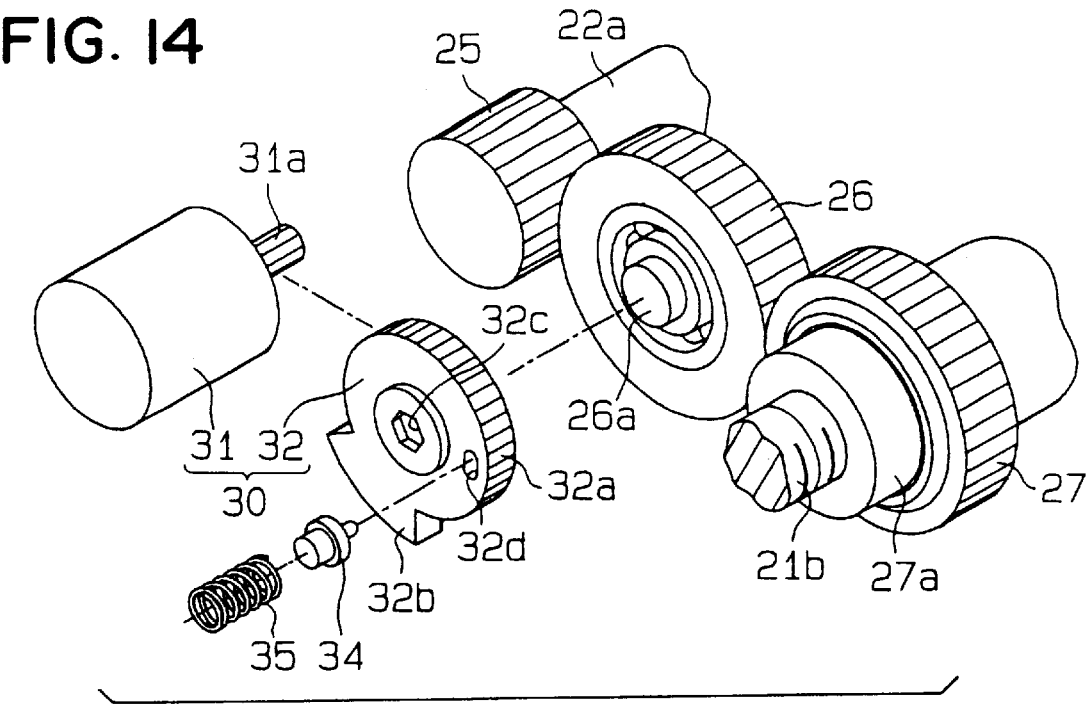
FIG. 14 is a perspective view showing a slipping prevention unit and a holding unit according to the modification.

As shown in FIGS. 9, 11 and 12, each of the pinion 53 and the first and second reduction gears 54, 55 is a helical gear. The pinion 53 and the second reduction gear 55 are torsion gears wrung in the clockwise direction toward the arrow E direction, and the first reduction gear 54 is a torsion gear wrung in the counterclockwise direction toward the arrow E direction. Therefore, in the second embodiment, when a rotation force in the rotation direction D is applied to the first reduction gear 54, a thrust force in the arrow E direction is applied to the first reduction gear 54.

FIGS. 8–12 show a slipping prevention unit 60 of the second embodiment. The slipping prevention unit 60 switches the operation of the first reduction gear 54 from a rotatable state to a non-rotatable state so that a slipping of the output shaft portion 55a due to an external force input from the output shaft portion 55a (load side) is prevented.

The first reduction gear 54 includes a complete gear portion 54a and an incomplete gear portion 54b. The complete gear portion 54a is formed into a complete gear shape. On the other hand, a gear shape of the incomplete gear portion 54b is not completely formed, and a gear recess of the incomplete gear portion 54b is gradually becomes shallower. The incomplete gear portion 54b is disposed of a back side of the complete gear portion 54a, relative to the arrow E direction.

The first reduction gear 54 is rotatably held in a shaft 61. The shaft 61 is held by a bolt 62 which is screwed into the housing 52 from an outside of the housing 52. A four-sided protrusion 62a is formed at a top end of the bolt 62, and is inserted into an insertion hole 61a of the shaft 61, as shown in FIG. 9. That is, the protrusion 62a of the bolt 62 is inserted into the insertion hole 61a of the shaft 61 so that the shaft 61 is movable in the axial direction while being not rotatable.

A screw portion 61b is provided on the outer peripheral surface of the shaft 61, and is connected to a worm wheel 63 having a screw hole 63a in the axial direction. The worm wheel 63 is disposed to be engaged with a worm 64a provided in a rotation shaft of the switching motor 64. The worm wheel 63 is held by the housing 52 and a stopper 65 attached to the housing 52, to be not movable in the axial direction. Further, circular protrusions 63b contacting the housing 52 and the stopper 65 are formed at both end surfaces of the worm wheel 63. By providing the circular protrusions 63b, contacting area of the worm wheel 63 contacting the housing 52 and the stopper 65 is made smaller, and sliding resistance of the worm wheel 63 during a rotation is reduced.

When the switching motor 64 is operated, the shaft 61 (first reduction gear 54) moves in the axial direction through the worm 64a and the worm wheel 63. By the operation of the switching motor 64, the first reduction gear 54 is switched between a first connection position shown in FIG. 11 and a second connection position shown in FIG. 12. At the first connection position in FIG. 11, the pinion 53 and the second reduction gear 55 are only connected to the complete gear portion 54a of the first reduction gear 54. On the other hand, at the second connection position in FIG. 12, the pinion 53 and the second gear portion 55 are connected to both the complete gear portion 54a and the incomplete gear portion 54b of the first reduction portion 54.

When the first gear 54 is disposed at the second connection position shown in FIG. 12, and when the rotation force in the rotation direction D is applied to the first reduction gear 54, a thrust force is applied in the arrow E direction due to the gear shapes of the pinion 53 and the first and second reduction gears 54, 55. In this case, the second reduction gear 55 and the pinion 53 are deeply pres-fitted into the incomplete gear portion 54b of the first reduction gear 54. Therefore, the rotation of the first reduction gear 54 becomes impossible. That is, at the second connection position, even when a rotation force is applied to the output shaft portion 55a, the rotation of the first reduction gear 54 in the rotation direction D is prohibited.

In the second embodiment, as shown in FIGS. 11, 12, the screw turn direction of the bolt 62 is opposite to that the screw portion 61b of the shaft 61. Specifically, the screw turn direction of the bolt 62 toward the arrow E direction is moved in the clockwise direction, and the screw turn direction of the screw portion 61b of the shaft 61 toward the arrow E direction is moved in the counterclockwise direction. Thus, when the bolt 62 is rotated in a detaching direction (i.e., the rotation direction C), the shaft 61 is moved in the arrow F direction opposite to the arrow E direction, through the worm wheel 63 and the screw hole 63, and the first reduction gear 54 (i.e., shaft 61) is moved in the arrow F direction.

When the actuator 50 is applied to the brake device 1 described in the first embodiment, the operation of the brake device 1 is controlled by the controller 40 (FIG. 6) to be switched between the normal brake mode and the parking brake mode. In accordance with the selected mode, the driving motor 22 and the switching motor 64 are controlled by the controller 40.

During the normal brake mode, the controller 40 controls the switching motor 64 so that the first reduction gear 54 is disposed at the first connection position shown in FIG. 11. At the first connection position, the pinion 53 and the second reduction gear 55 are connected to only the complete gear portion 54a of the first reduction gear 54, and the driving motor 22 is operated. The controller 40 controls the driving motor 22 in accordance with the stepping amount, and controls the brake force of the brake unit 1, similarly to the first embodiment.

During the parking brake mode, firstly, the driving motor 22 is controlled by the controller 40 to be rotated in the rotation direction A so that braking force (contact pressure) of the brake shoes 4, 5 relative to the brake drum 2 becomes larger than a predetermined value. That is, the driving motor 22 is rotated in the rotation direction A until a brake force necessary for a vehicle parking is obtained. Next, the controller 40 controls the switching motor 64 so that the first reduction gear 54 is set at the second connection position shown in FIG. 12. At this time, the incomplete gear portion 54b of the first reduction gear 54 is press-fitted to the second reduction gear 55 and the pinion 53. Therefore, the rotation of the first reduction gear 54 becomes difficult. At this time, a reaction force for separating the brake shoes 4, 5 from the brake drum 2 is always applied to the protrusion direction (left direction in FIG. 1) of the operation shaft 21 through the operation lever 10. The reaction force is for rotating the first reduction gear 54 in the rotation direction D through the output shaft portion 55a.

Here, a thrust force is applied to the first reduction gear 54 in the arrow E direction due to the pinion 53 and the first and second reduction gears 54, 55. In this case, the second reduction gear 55 and the pinion 53 are deeply presfitted into the incomplete gear portion 54b of the first reduction gear 54. Therefore, the rotation of the first reduction gear 54 becomes impossible. That is, at the second connection position, even when a rotation force is applied to the output shaft portion 55a, the rotation of the first reduction gear 54 in the rotation direction D is prohibited, and a slipping of the output shaft portion 55a is prevented. As a result, during parking brake mode, a necessary braking force for parking is maintained in the brake device 1 without moving the operation shaft 21 in the protrusion direction (left direction in FIG. 1).

During the parking brake mode, the rotation force in the rotation direction D is always applied to the first reduction gear 54 through the output shaft portion 55a. Therefore, the thrust force in the arrow E direction is always applied to the first reduction gear 54, and the incomplete gear portion 54a of the first reduction gear 54 are deeply press-fitted to the second reduction gear 55 and the pinion 53. As a result, even when electrical power supplying to the switching motor 64 is stopped, the first reduction gear 54 is maintained at the second connection position.

On the other hand, when a parking brake releasing signal is output from the parking brake operation switch 43, firstly, the controller 40 controls the driving motor 22 so that the driving motor 22 is rotated in the rotation direction A and the press force of the brake shoes 4, 5 is increased. In this case, due to the engagement of the pinion 53 and the first and second reduction gears 54, 55, a thrust force in the arrow F direction is applied to the first reduction gear 54, and the press-fitting of the incomplete gear portion 54b relative to the second reduction gear 55 and the pinion 53 is released.

Thereafter, the controller 40 controls the switching motor 64 so that the first reduction gear 54 is set at the first connection position shown in FIG. 11. At this time, when the brake pedal is not stepped, the driving motor 22 is rotated in the rotation direction B by the controller 40, and the brake shoes 4, 5 are moved to be away from the brake drum 2. Thus, the brake device 1 is possible to perform the normal brake operation.

In a state where the parking brake is braked, when the driving motor 22 and the switching motor 64 have a trouble or when the driving motor 22 and the switching motor 64 are not operated due to a battery trouble, the parking brake can be manually released in the second embodiment of the present invention. That is, when the bolt 62 shown in FIGS. 7, 11, 12 is rotated in a detaching direction (the rotation direction C), the shaft 61 is moved in the arrow F direction through the worm wheel 63. Here, when the first reduction gear 54 is moved from the second connection position to the first connection position, the pinion 53 of the driving motor 22 becomes free, and is rotated due to the reaction force for separating the brake shoes 4, 5 from the brake drum 2. As a result, the parking brake is released.

According to the second embodiment of the present invention, the slipping prevention unit 60 includes the regulation gear 54, and the switching motor 64. The switching motor 64 switches operation of the first reduction gear 54 between the first connection position and the second connection position through the shaft 61 and the worm wheel 63. Thus, the slipping prevention unit 60 has a simple structure, and number of components of the actuator 50 is reduced.

Because the rotation of the second reduction gear 55 is regulated in the first reduction gear 54 by the slipping prevention unit 60 in order to prevent the slipping of the output shaft portion 55a, a special component for preventing the slipping of the output shaft portion 55a is not necessary. Therefore, the number of components of the actuator 50 is further reduced. Further, because the slipping prevention unit 60 is disposed in the first reduction gear 54, the structure of the actuator 50 in the axial direction becomes simple.

During the parking brake mode, the thrust force in the arrow E direction is always applied to the first reduction unit 54, and the pinion 53 and the first and second reduction gears 54, 55 are constructed so that the incomplete gear portion 54b of the first reduction gear 94 is press-fitted to the second reduction gear 55 and the pinion 53. Therefore, even when the electrical power supply to the switching motor 64 is shut off during the parking brake mode, the second connection position of the first reduction gear 54 is maintained. Thus, during the parking brake mode, electrical power is not consumed for the switching motor 64 (actuator 50), and the battery 41 can be used for a long time.

Further, according to the second embodiment of the present invention, when the bolt 62 is rotated in the detaching direction (i.e., the rotation direction C), the first reduction gear 54 is moved from the second connection position to the first connection position. Therefore, it is possible to manually release the parking brake.

Although the present invention h as been fully described in connection with the preferred embodiments thereof with reference to the accompanying drawings, it is to be noted that various changes and modifications will become apparent to those skilled in the art.

For example, in the above-described first embodiment of the present invention, even when the electrical power supply to the switching motor 31 is stopped, the regulation gear 32 is maintained at the non-engagement position in FIG. 4 by the self-weight. However, an elastic unit such as a spring may be used, and the regulation gear 32 may be disposed at the non-engagement position by using the spring force of the elastic unit, as shown in FIGS. 13–16, for example.

Specifically, as shown in FIGS. 13–16, an engagement recess 32d is provided at a side surface of the first engagement portion 32a of the regulation gear 32, and is gradually curved toward a bottom side. On the other hand, a receiving recess portion 24c is provided in the housing 24, and an engagement pin 34 for engaging with the engagement recess 32d of the regulation gear 32 is held in the receiving recess portion 24c of the housing 24 to be movable in the axial direction when the regulation gear 32 is disposed at the non-engagement position shown in FIG. 15. The engagement pin 34 is made of metal having a high heat resistance, and a top end of the engagement pin 34 engaging with the engagement recess 32d has a round shape. The engagement pin 34 is biased at a side of the regulation gear 32 by a spring 35. That is, the engagement pin 34, the spring 35 and the engagement recess 32d construct a holding unit of the regulation gear 32 at the non-engagement position.

Figure 15:
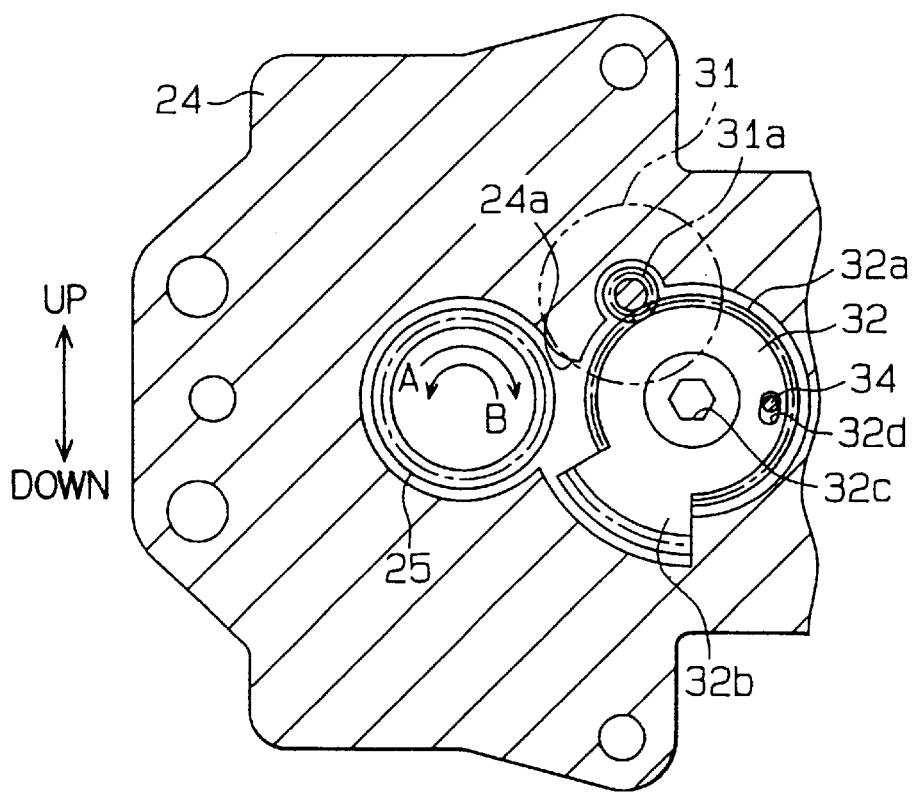
FIG. 15 is a cross-sectional view taken along line XV—XV in FIG. 13, showing the slipping prevention unit and the holding unit at a non-engagement position.
Figure 16:
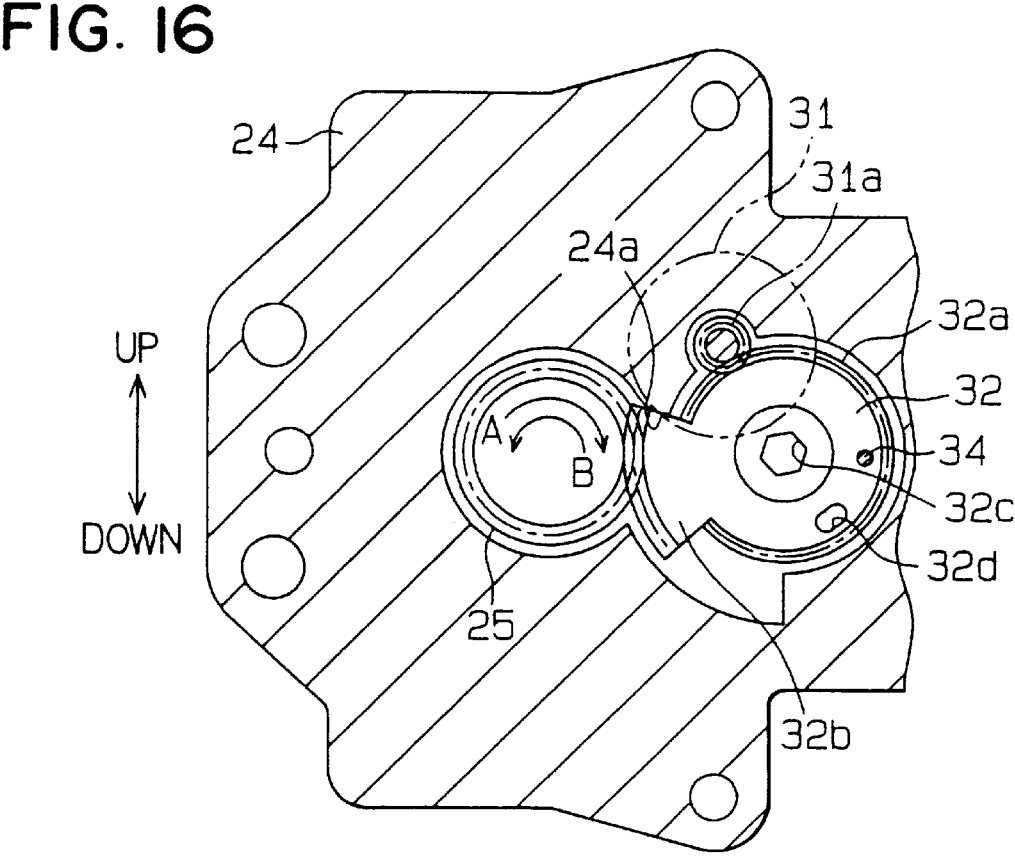
FIG. 16 is a cross-sectional view showing the slipping prevention unit and the holding unit at an engagement position according to the modification.

When the regulation gear 32 is disposed at the non-engagement position shown in FIG. 15, the engagement pin 34 engages with the engagement recess 32d so that the regulation gear 32 is maintained at the non-engagement position. Therefore, a sudden rotation of the regulation gear 32 due to a vibration and the like is accurately prevented, and therefore, an interruption between the pinion 25 and the regulation gear 32 is prevented at the non-engagement position. Thus, it prevents an error operation of the actuator 20. Here, the holding unit for holding the regulation gear 32 at the non-engagement position can be constructed by a simple structure such as the engagement recess 32d and the engagement pin 34.

Further, during the parking brake mode, the regulation gear 32 is rotated in the clockwise direction in FIG. 15 by the operation of the switching motor 31, and the engagement pin 34 is moved onto a side surface of the engagement recess 32d while opposing the spring force of the spring 35 so that the engagement between the engagement pin 34 and the engagement recess 32d is released. At this time, the regulation gear 32 is rotated to the engagement position shown in FIG. 16. Because the top end of the engagement pin 34 has the round shape and the bottom surface of the engagement recess 32d is curved, the engagement pin 34 is readily moved onto the side surface of the engagement recess 32d. Thus, the switching motor 31 can be smoothly operated while it prevents a large load from being applied to the switching motor 31.

Figure 17:
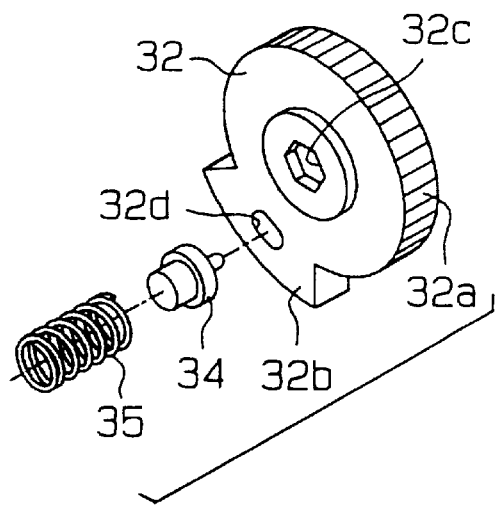
FIG. 17 is a perspective view showing a holding unit according to an another modification of the present invention.

In the modification of FIGS. 13–16, the engagement recess 32d is provided at the side surface of the first engagement portion 32a. However, the engagement recess 32d may be provided in a side surface of the second engagement portion 32b, as shown in FIG. 17. In this case, because the engagement recess 32d is positioned at a radial outer side from that shown in FIGS. 13–16, the holding force of the regulation gear 32 becomes larger.

Figure 18:
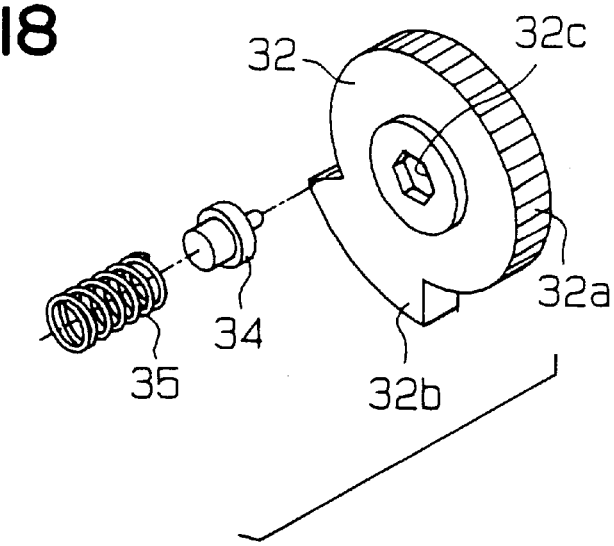
FIG. 18 is a perspective view showing a holding unit according to an another modification of the present invention.

The engagement recess may be not provided as shown in FIG. 18. That is, as shown in FIG. 18, the engagement pin 34 engages with a peripheral end surface of the second engagement portion 32b, so that the regulation gear 32 is held at the non-engagement position. In this case, because it is not necessary to change the shape of the regulation gear 32, the regulation gear 32 has a simple shape.

The engagement pin 34 may be made of a resinous material having a high heat resistance. In this case, a sliding resistance of the engagement pin 34 relative to the side surface of the regulation gear 32 and the side surface and the bottom surface of the engagement recess 32d becomes smaller, and the rotation load of the switching motor 31 becomes smaller.

Further, the holding unit for holding the regulation gear 32 at the non-engagement position may be constructed by the other structure. For example, the regulation gear 32 may be made of iron, and the second engagement portion 32b may be moved by a permanent magnet and the like so that the regulation gear 32 is accurately disposed at the non-engagement position.

Figure 19:
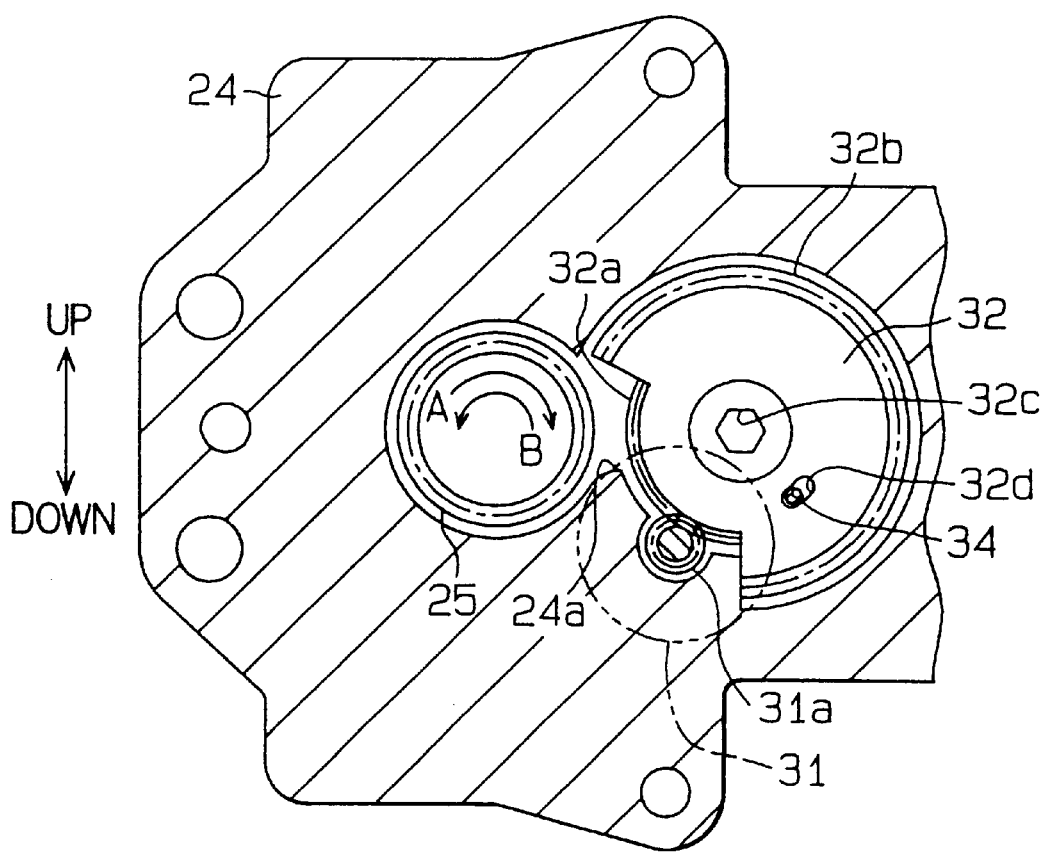
FIG. 19 is a cross-sectional view showing a slipping prevention unit and a holding unit at a non-engagement position according to a further another modification of the present invention.
Figure 20:
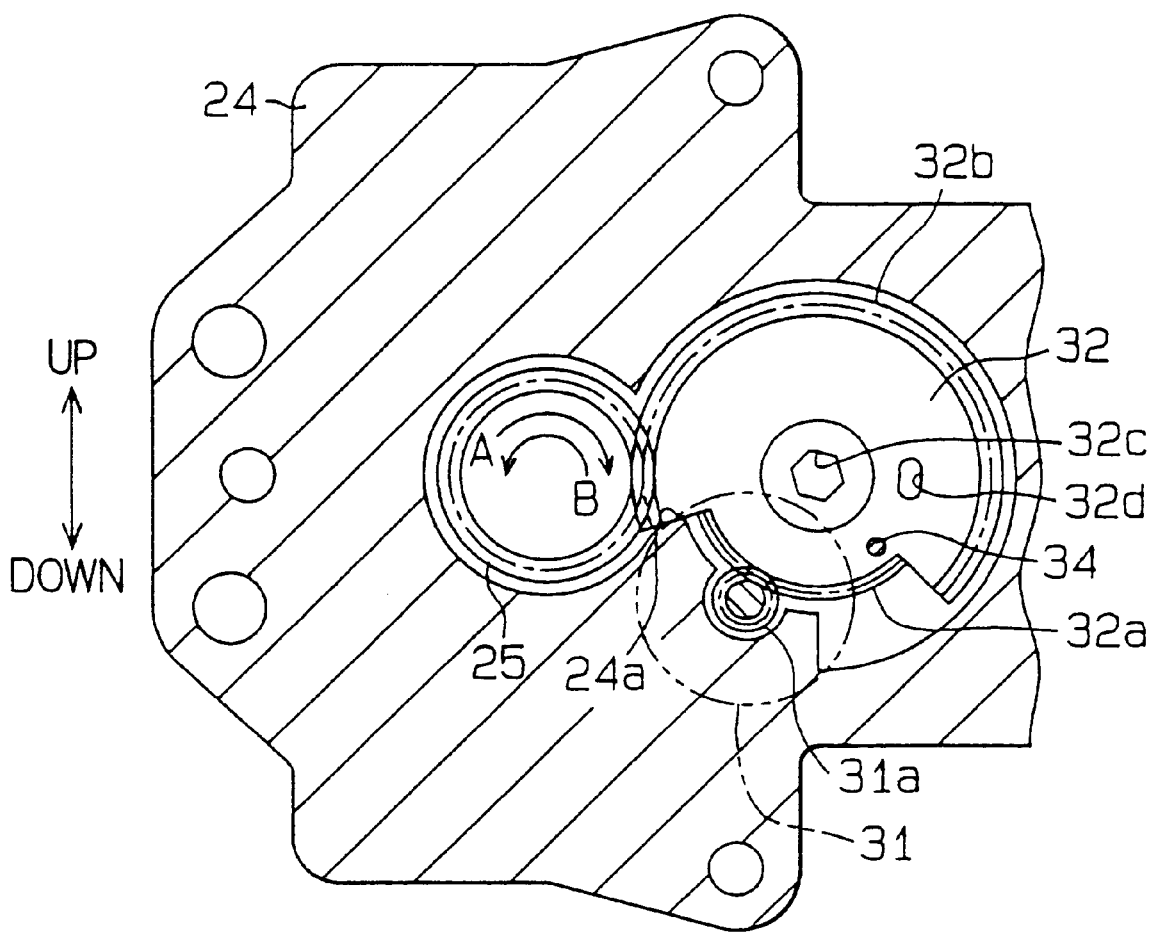
FIG. 20 is a cross-sectional view showing the slipping prevention unit and the holding unit at an engagement position according to the further another modification in FIG. 19.

In the above-described first embodiment of the present invention, the regulation gear 32 is formed as shown in FIGS. 3–5. However, the shape of the regulation gear 32 may be changed. For example, as shown in FIGS. 19, 20, the second engagement portion 32b may be formed over equal to or more than 180° in the regulation gear 32. In this case, the arrangement of the switching motor 31 and the regulation wall 24a is necessary to be changed so that the regulation gear 32 disposed at the non-engagement position shown in FIG. 19 is maintained by the self-weight. Alternatively, the holding unit for the regulation gear 32 may be provided. Here, FIG. 19 shows a non-engagement position of the regulation gear 32, and FIG. 20 shows the engagement position of the regulation gear 32.

In the above-described first embodiment, the rotation of the pinion 25 is regulated by the regulation gear 32. However, the rotation of the first and second reduction gears 26, 27 may be regulated by the regulation gear 32. Further, a rotation member rotated together with the driving motor 22, except for the pinion 25 and the gears 26, 27, may be engaged with the regulation gear 32.

In the above-described first embodiment, the regulation gear 32 is rotated by the switching motor 31. However, the regulation gear 32 may be rotated by a magnetic force by using an electromagnetic coil.

In the above-described second embodiment of the present invention, the shaft 61 (the first reduction gear 54) is moved in the axial direction by the switching motor 64. However, the first reduction gear 54 may be moved in the axial direction by the magnetic force using an electromagnetic coil.

In the above-described second embodiment, the pinion 53, the first and second reduction gears 54, 55 are helical gears; however, may be formed by flat gears.

In each of the above-described embodiments, the actuator 20, 50 are disposed so that the operation shaft 21 protrudes toward the left side in FIG. 1. However, the operation shaft 21 may protrude toward the right side in FIG. 1. In this case, the arrangement of components constructing the brake device 1 is necessary to be changed to correspond to the arrangement of the operation shaft 21.

In each of the above-described embodiments, the present invention is applied to the actuators 20, 50 for the brake device 1; however, may be applied to an actuator for driving a load.

Such changes and modifications are to be understood as being within the scope of the present invention as defined by the appended claims.

What is claimed is:

1. An actuator having an output shaft for driving a load, comprising:
   a driving motor for driving and operating said output shaft; and
   a slipping prevention unit which prevents a slipping of said output shaft due to an external force from a load side, wherein said slipping prevention unit includes:
      a rotation member rotating with a rotation of said driving motor, said rotation member being a reduction gear through which an output of said driving motor is reduced and is transmitted to said output shaft,
      a rotation regulation unit having an engagement portion engaging with said rotation member, said engagement portion having a contact surface in a rotation direction for contacting said rotation member, and
      a switching unit which electrically switches operation of said rotation regulation unit between an engagement state where said engagement portion of said rotation regulation unit engages with said rotation member, and a non-engagement state where said engagement portion is disengaged with said rotation member; and
   said rotation regulation unit is disposed so that at least one side rotation of said rotation member is prevented in said engagement state.

2. The actuator according to claim 1, wherein said rotation regulation unit is rotated in a rotation direction by said switching unit to switch said engagement state and said non-engagement state at predetermined rotation positions.

3. The actuator according to claim 2, wherein said engagement portion is provided in a part of a peripheral surface of said rotation regulation unit in a peripheral direction.

4. The actuator according to claim 1, wherein said rotation regulation unit is moved in an axial direction of said rotation member by said switching unit to switch said engagement state and said non-engagement state.

5. An actuator having an output shaft for driving a load, comprising:
   a driving motor for driving and operating said output shaft; and
   a slipping prevention unit which prevents a slipping of said output shaft due to an external force from a load side, wherein said slipping prevention unit includes:
      a rotation member rotating with a rotation of said driving motor,
      a rotation regulation unit having an engagement portion engaging with said rotation member, said engagement portion having a contact surface in a rotation direction for contacting said rotation member, and
      a switching unit which electrically switches operation of said rotation regulation unit between an engagement state where said engagement portion of said rotation regulation unit engages with said rotation member, and a non-engagement state where said engagement portion is disengaged with said rotation member;
   said rotation regulation unit is disposed so that at least one side rotation of said rotation member is prevented in said engagement state;
   a housing for accommodating said slipping prevention unit; and
   wherein said housing has a regulation wall which contacts an end surface of said engagement portion in the rotation direction, in said engagement state.

6. An actuator having an output shaft for driving a load, comprising:
   a driving motor for driving and operating said output shaft; and
   a slipping prevention unit which prevents a slipping of said output shaft due to an external force from a load side, wherein said slipping prevention unit includes:
      a rotation member rotating with a rotation of said driving motor,
      a rotation regulation unit having an engagement portion engaging with said rotation member, said engagement portion having a contact surface in a rotation direction for contacting said rotation member, and
      a switching unit which electrically switches operation of said rotation regulation unit between an engagement state where said engagement portion of said rotation regulation unit engages with said rotation member, and a non-engagement state where said engagement portion is disengaged with said rotation member; and
   said rotation regulation unit is disposed so that at least one side rotation of said rotation member is prevented in said engagement state, and wherein said rotation regulation unit is moved in an axial direction of said rotation member by said switching unit to switch said engagement state and said non-engagement state;
   said rotation member includes a first reduction gear and a second reduction gear through which an output of said driving motor is reduced and is transmitted to said output shaft;
   said first gear has a complete gear portion at one end side in the axial direction, said complete gear portion being engaged with said second reduction gear to be rotatable with said second reduction gear in a rotation direction;
   said engagement portion is an incomplete gear portion provided in said first reduction gear at the other end side in the axial direction; and
   in said engagement state, said incomplete gear portion is press-fitted to said second reduction gear so that a rotation movement of said rotation member is prevented.

7. The actuator according to claim 6, wherein:
   said first reduction gear and said second reduction gear are helical gears; and said helical gears are disposed so that said incomplete gear portion of said first reduction gear is press-fitted to said second reduction gear when said engagement state is switched.

8. An actuator having an output shaft for driving a load, comprising:
   a driving motor for driving and operating said output shaft; and
   a slipping prevention unit which prevents a slipping of said output shaft due to an external force from a load side, wherein said slipping prevention unit includes:
      a rotation member rotating with a rotation of said driving motor,
      a rotation regulation unit having an engagement portion engaging with said rotation member, said engagement portion having a contact surface in a rotation direction for contacting said rotation member, said rotation regulation unit including a manual switching member which is disposed to manually switch an operation from said engagement state to said non-engagement state, and
      a switching unit which electrically switches operation of said rotation regulation unit between an engagement state where said engagement portion of said rotation regulation unit engages with said rotation member, and a non-engagement state where said engagement portion is disengaged with said rotation member; and
   said rotation regulation unit is disposed so that at least one side rotation of said rotation member is prevented in said engagement state.

9. An actuator having an output shaft for driving a load, comprising:
   a driving motor for driving and operating said output shaft; and
   a slipping prevention unit which prevents a slipping of said output shaft due to an external force from a load side, wherein said slipping prevention unit includes:
      a rotation member rotating with a rotation of said driving motor,
      a rotation regulation unit having an engagement portion engaging with said rotation member, said engagement portion having a contact surface in a rotation direction for contacting said rotation member, and
      a switching unit which electrically switches operation of said rotation regulation unit between an engagement state where said engagement portion of said rotation regulation unit engages with said rotation member, and a non-engagement state where said engagement portion is disengaged with said rotation member;
   said rotation regulation unit is disposed so that at least one side rotation of said rotation member is prevented in said engagement state; and
   a holding unit which maintains a non-engagement position of said rotation regulation unit when said rotation regulation unit is in said non-engagement state.

10. The actuator according to claim 9, wherein:
    said holding unit includes a first engagement member provided in said rotation regulation unit, and a second engagement member; and
    said second engagement member is engaged with said first engagement member during said non-engagement state to prevent a movement of said rotation member in a rotation direction.

11. An actuator having an output shaft for driving a load, comprising:
    a driving motor for driving and operating said output shaft;
    a rotation member rotating with a rotation of said driving motor; and
    a slipping prevention unit which prevents a slipping of said output shaft due to an external force from a load side, wherein:
       said slipping prevention unit includes:
          a rotation regulation unit having an engagement portion which engages with said rotation member in a rotation direction of said rotation member, and
          a switching unit which electrically switches operation of said rotation regulation unit between an engagement state where said engagement portion of said rotation regulation unit engages with said rotation member, and a non-engagement state where said engagement portion is disengaged with said rotation member;
       said rotation regulation unit is rotated by said switching unit to switch said engagement state and said nonengagement state;
       said rotation regulation unit is disposed so that at least one side rotation of said rotation member is prevented in said engagement state; and
       a housing for accommodating said slipping prevention unit,
    wherein said housing has a regulation wall which contacts an end surface of said engagement portion in said rotation direction, in said engagement state.

12. An actuator having an output shaft for driving a load, comprising:
    a driving motor for driving and operating said output shaft;
    a rotation member rotating with a rotation of said driving motor; and
    a slipping prevention unit which prevents a slipping of said output shaft due to an external force from a load side, wherein:
       said slipping prevention unit includes:
          a rotation regulation unit having an engagement portion which engages with said rotation member in a rotation direction of said rotation member, and
          a switching unit which electrically switches operation of said rotation regulation unit between an engagement state where said engagement portion of said rotation regulation unit engages with said rotation member, and a non-engagement state where said engagement portion is disengaged with said rotation member;
       said rotation regulation unit is rotated by said switching unit to switch said engagement state and said nonengagement state;
       said rotation regulation unit is disposed so that at least one side rotation of said rotation member is prevented in said engagement state;
       said rotation regulation unit includes a nonengagement portion which is disengaged with said rotation member in said rotation direction; and
       said engagement portion protrudes from said nonengagement portion to a radial outer side.

13. An actuator having an output shaft for driving a load, comprising:
    a driving motor for driving and operating said output shaft;
    a rotation member rotating with a rotation of said driving motor; and a slipping prevention unit which prevents a slipping of said output shaft due to an external force from a load side, wherein:

said slipping prevention unit includes:

a rotation regulation unit having an engagement portion which engages with said rotation member in a rotation direction of said rotation member, and a switching unit which electrically switches operation of said rotation regulation unit between an engagement state where said engagement portion of said rotation regulation unit engages with said rotation member, and a non-engagement state where said engagement portion is disengaged with said rotation member;

said rotation regulation unit is rotated by said switching unit to switch said engagement state and said nonengagement state;

said rotation regulation unit is disposed so that at least one side rotation of said rotation member is prevented in said engagement state; and wherein said rotation regulation unit is a regulation gear disposed to be movable only in a rotation direction.

* * * * *

UNITED STATES PATENT AND TRADEMARK OFFICE
CERTIFICATE OF CORRECTION

PATENT NO. : 6,364,085 B1 Page 1 of 1
DATED : April 2, 2002
INVENTOR(S) : Ueno et al.

It is certified that error appears in the above-identified patent and that said Letters Patent is hereby corrected as shown below:

Title page,
Item [*], Notice, delete phrase "by 0 days" and insert -- by 11 days --

Signed and Sealed this

Twenty-first Day of September, 2004

JON W. DUDAS
*Director of the United States Patent and Trademark Office*